(12) United States Patent
Higuchi et al.

(10) Patent No.: US 7,684,362 B2
(45) Date of Patent: Mar. 23, 2010

(54) MIMO MULTIPLE TRANSMISSION DEVICE AND METHOD

(75) Inventors: Kenichi Higuchi, Yokohama (JP); Noriyuki Maeda, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 858 days.

(21) Appl. No.: 11/346,319

(22) Filed: Feb. 3, 2006

(65) Prior Publication Data
US 2006/0209813 A1    Sep. 21, 2006

(30) Foreign Application Priority Data
Feb. 3, 2005    (JP)    ............... 2005-027733

(51) Int. Cl.
H04B 7/02    (2006.01)
(52) U.S. Cl. .............. 370/328; 375/299; 455/66.1; 455/101
(58) Field of Classification Search ........... 370/366, 370/391, 328, 339; 375/267, 295, 299; 455/66, 455/101–105, 500
See application file for complete search history.

(56) References Cited

U.S. PATENT DOCUMENTS

| | | | |
|---|---|---|---|
| 6,526,538 B1 * | 2/2003 | Hewitt | |
| 6,564,343 B1 * | 5/2003 | Yamashita | |
| 6,571,366 B1 * | 5/2003 | Doetsch et al. | |
| 6,629,286 B1 * | 9/2003 | Berens et al. | |
| 6,665,833 B1 * | 12/2003 | Tong et al. | |
| 6,768,728 B1 * | 7/2004 | Kim et al. | |
| 6,769,093 B1 * | 7/2004 | Krieger | |
| 6,952,454 B1 * | 10/2005 | Jalali et al. | ............ 375/260 |
| 7,013,023 B2 * | 3/2006 | Ehrmann Patin et al. | |
| 7,050,410 B1 * | 5/2006 | Kim et al. | ............ 370/335 |

(Continued)

FOREIGN PATENT DOCUMENTS

EP    1 298 829 A1    4/2003

(Continued)

OTHER PUBLICATIONS

LG Electronics, "Multiplexing Chain for MIMO System", 3GPP TSG RAN WG1 #36, R1-040259, Feb. 16-20, 2004, 4 pages.

(Continued)

*Primary Examiner*—Pankaj Kumar
*Assistant Examiner*—Duc T Duong
(74) *Attorney, Agent, or Firm*—Oblon, Spivak, McClelland, Maier & Neustadt, L.L.P.

(57) ABSTRACT

A MIMO multiple transmission device, comprising a packet data block generator (111) for generating a packet data block as a resent unit for hybrid ARQ; a CRC adder (112) for adding an error detection code; a channel encoder (113) for performing channel encoding, the packet data block generator, the CRC adder and the channel encoder being coupled in series in one or more data streams; a parallel-to-serial converter (114) for converting output of the channel encoder to serial form; an interleaver between transmission streams (115) for performing interleaving between transmission streams on outputs from the parallel-to-serial converter; a serial-to-parallel converter (116) for converting outputs from the interleaver between transmission streams to parallel form; a coding rate changer (117) for changing a coding rate; and a data modulator (119) for modulating data, the coding rate changer and the data modulator being connected in series in plural data streams divided by the serial-to-parallel converter.

9 Claims, 23 Drawing Sheets

U.S. PATENT DOCUMENTS

| | | | |
|---|---|---|---|
| 7,260,366 B2 * | 8/2007 | Lee et al. | |
| 7,263,133 B1 * | 8/2007 | Miao | 375/267 |
| 7,496,079 B2 * | 2/2009 | Kim et al. | 370/342 |
| 2002/0154705 A1 * | 10/2002 | Walton et al. | |
| 2004/0071223 A1 * | 4/2004 | Ko et al. | |
| 2004/0136465 A1 * | 7/2004 | Hwang et al. | |
| 2004/0170186 A1 * | 9/2004 | Shao et al. | 370/412 |
| 2004/0268206 A1 | 12/2004 | Kim et al. | |
| 2005/0094603 A1 * | 5/2005 | Kim et al. | 370/334 |
| 2006/0268880 A1 * | 11/2006 | Zhao et al. | |

OTHER PUBLICATIONS

Mathini Sellathurai, et al., "Joint Beamformer Estimation and Co-Antenna Interference Cancelation for TURBO-BLAST", IEEE International Conference on Acoustics, Speech, and Signal Processing (ICASSP), vol. 1 of 6, XP-010803273, May 7, 2001, pp. 2453-2456.

Ka Leong Lo, et al., "Performance Comparison of Layered Space Time Codes", IEEE International Conference on Communications (ICC 2002), vol. 1 of 5, XP-010589715, Apr. 28, 2002, pp. 1382-1387.

Mathini Sellathurai, et al., "A Simplified Diagonal BLAST Architecture with Iterative Parallel-Interference Cancelation Receivers", IEEE International Conference on Communications (ICC 2001), vol. 1 of 10, XP 010553817, Jun. 11, 2001, pp. 3067-3071.

Ka Leong Lo, et al., "Layered Space Time Coding with Joint Iterative Detection, Channel Estimation and Decoding", IEEE $7^{TH}$ International Symposium on Spread-Spectrum Techniques and Applications, vol. 2, XP-010615481, Sep. 2, 2002, pp. 308-312.

Youngsoo Yuk, et al., "Serially Concatenated Space-Time Code using 2D Interleaver", IEEE $54^{TH}$ Vehicular Technology Conference (VTC 2001), vol. 1 of 4, XP-010562423, Oct. 7, 2001, pp. 2506-2509.

* cited by examiner

| DATA MODULATION SYSTEM | CHANNEL CODING RATE | RELATIVE BIT RATE |
|---|---|---|
| QPSK | 1/3 | 1 |
| QPSK | 1/2 | 1.5 |
| QPSK | 2/3 | 2 |
| QPSK | 6/7 | 2.57 |
| 16QAM | 1/2 | 3 |
| 16QAM | 2/3 | 4 |
| 16QAM | 3/4 | 4.5 |
| 16QAM | 5/6 | 5 |
| 16QAM | 6/7 | 5.24 |
| 16QAM | 8/9 | 5.33 |

*BACKGROUND ART*

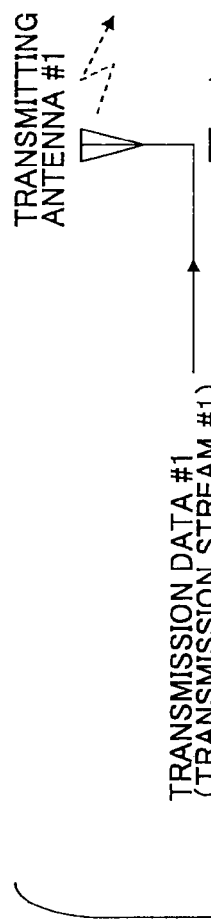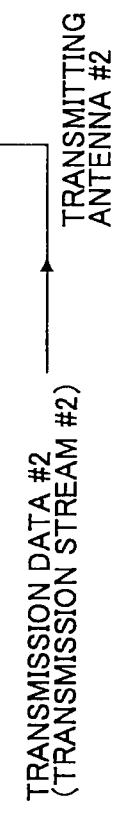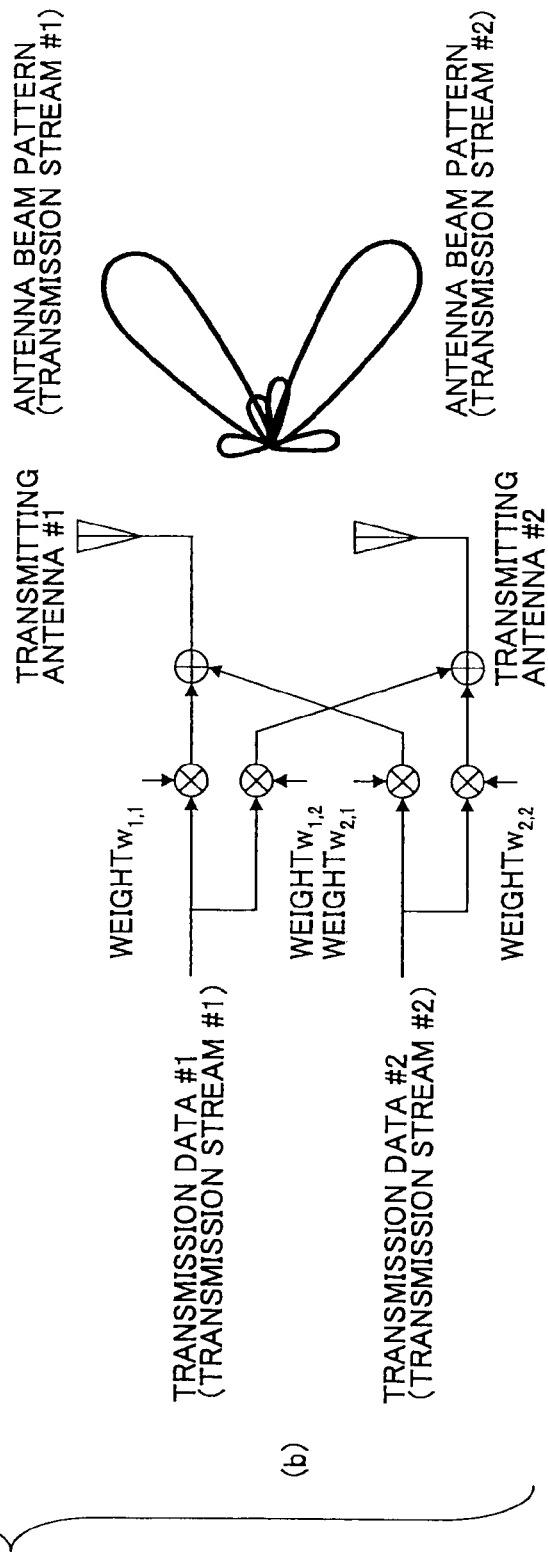
FIG. 7

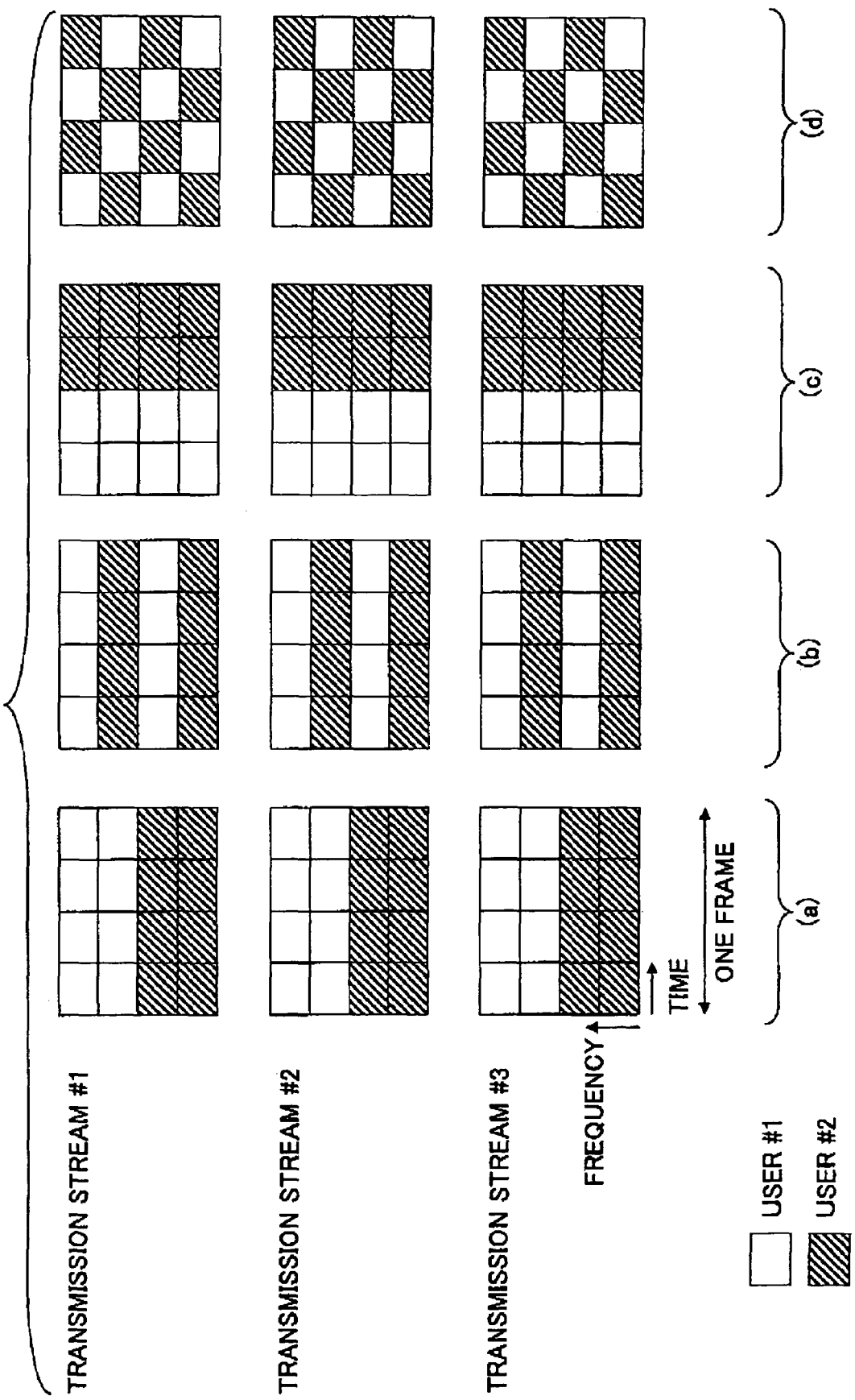

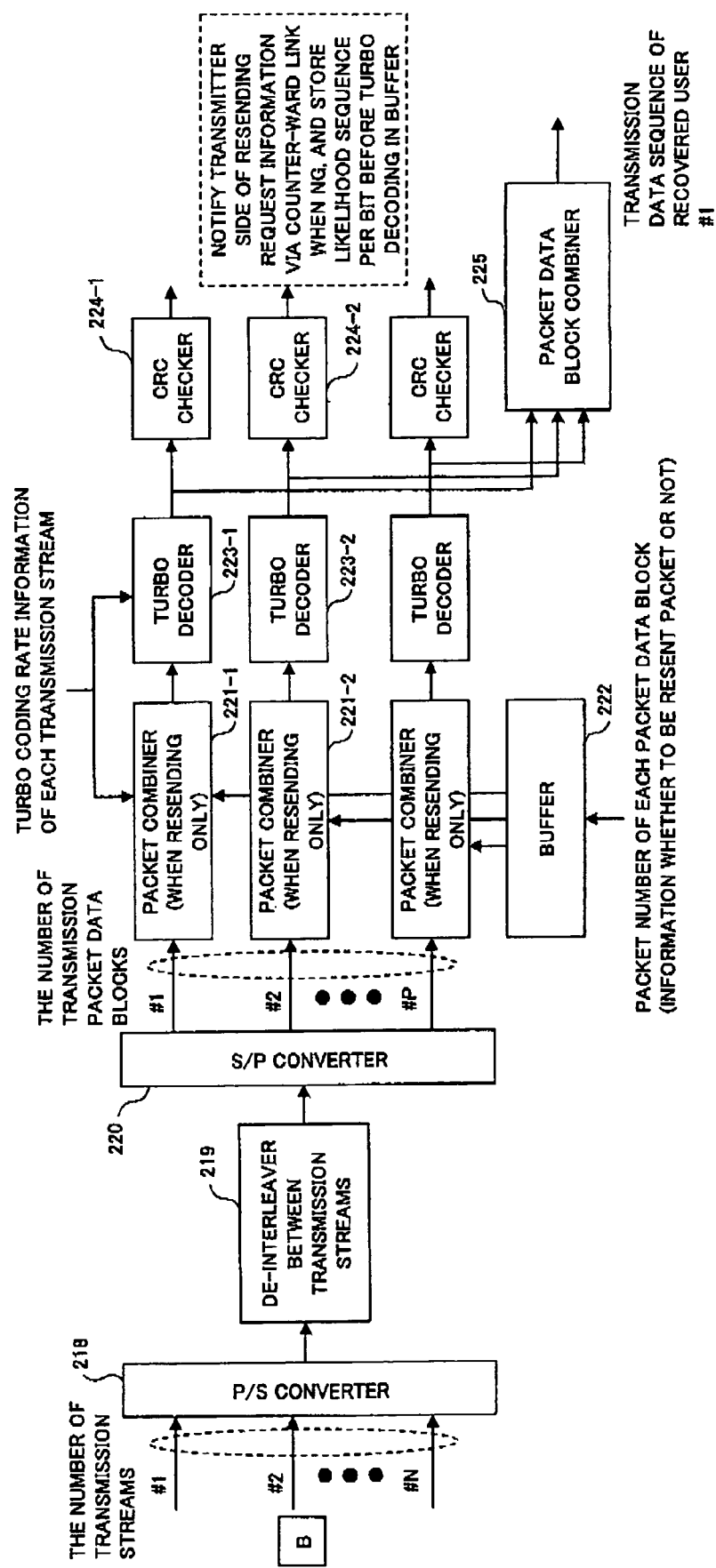

MIMO MULTIPLE TRANSMISSION DEVICE AND METHOD

BACKGROUND OF THE INVENTION

The present invention generally relates to a MIMO multiple transmission device and method.

In general, the more the communication data rate is increased, the more the reception errors occur. For example, if the data modulation system is changed from 2 bits/1 symbol QPSK (Quadrature Phase Shift Keying) to 4 bits/1 symbol 16QAM (Quadrature Amplitude Modulation) or 6 bits/1 symbol 64QAM, the data rate is increased, but the data error rate is also increased.

As one technology in which the relationship between the data rate and the data error rate is adequately controlled according to communication status, the AMC (Adaptive Modulation and channel Coding) is known, where the data modulation system and the channel coding rate are adequately controlled according to communication status.

FIG. 1 is a conceptual diagram of a general adaptive modulation and channel coding (AMC) system. A base station 100 transmits to a user #1 terminal 201 and a user #2 terminal 202 with the same transmission power. The user #1 terminal 201 located near to the base station 100 receives high receiving power and has good channel conditions. Accordingly, a high data rate modulation system (for example, 16QAM) and a high channel coding rate are selected for the user #1 terminal 201. The user #2 terminal 202 located far away from the base station 100 receives low receiving power and has bad channel conditions. Accordingly, a low data rate but low data error rate modulation system (for example, QPSK) and low channel data rate are selected for the user #2 terminal 202.

FIG. 2 is a chart showing combinations of data modulation systems and channel coding rates. In the direction (downward direction) shown by an arrow, the data rates are increased, but the data error rates are also increased. Accordingly, the better the channel conditions are, the lower is the combination of modulation system and channel selected in the chart. Conversely, the worse the channel conditions are, the higher is the combination of modulation system and channel selected in the chart. In practice, a table is previously prepared, in which SIR (Signal to Interference power Ratio) as an index of channel conditions corresponds to data modulation systems and channel coding rates. With reference to the table in accordance with a measured channel condition, an adequate combination of data modulation system and channel coding rate is selected to realize AMC.

As one technology for dealing with data errors, the hybrid ARQ (Automatic Repeat Request) is known. The ARQ is a combination of packet re-send request when detecting error by CRC (Cyclic Redundancy Check) and error channel demodulation by error correction coding (channel coding).

FIG. 3 shows procedures of a general hybrid ARQ system. At a transmitter side, CRC bit addition (Step S1) and error correction coding (Step S2) are performed. At a receiver side, error correction decoding (Step S3) and error detection using CRC bits (Step S4) are performed. If an error exists, a re-send request is sent to the transmitter side. If no error exists, the transmission (reception) is completed (Step S5).

FIG. 4 shows three processing types (a), (b) and (c) in the hybrid ARQ. In the type (a), if a packet P1 has a demodulation error, the packet P1 is discarded, and a packet P2 having the same contents is re-sent and demodulated again. In the types (b) and (c), if a packet P1 has a demodulation error, the packet P1 is not discarded but held, and the held packet P1 and a re-sent packet P2 are combined to generate a packet P3, which is demodulated. In the type (b), the same packet is re-sent and the packet combination is performed to improve reception SIR. In the type (c), the re-sent packet had been punctured with a different pattern, and the packet combination is performed to improve coding gain.

FIG. 5 shows a structure of one antenna transmission frame generating unit in which the above mentioned AMC and hybrid ARQ are employed. The transmission frame generating unit comprises a packet data block generator 101, a CRC adder 102, a channel encoder 103, a coding rate changer 104, an interleaver 105 and a data modulator 106, which are connected in series. The packet data block generator 101 generates a packet data block (referred to as "transport block" in 3GPP (3rd Generation Partnership Project)) as one re-sent unit for the hybrid ARQ. The CRC adder 102 adds CRC. The channel encoder 103 performs channel encoding. The coding rate changer 104 performs coding rate changing by rate matching (puncture, repetition), and controls the repetition pattern and puncturing when resending in the hybrid ARQ. The interleaver 105 performs interleaving between transmission streams (including interleaving between frequencies in OFDM (Orthogonal Frequency Division Multiplexing)). The data modulator 106 performs data modulation.

As one technology realizing large capacity high speed information communication, the MIMO (Multi Input Multi Output) multiple system is known. FIG. 6 schematically shows the concept of the MIMO multiple system. As shown in (a), in a transmitter side, data are serial-to-parallel converted (Step S11) and transmitted via plural transmitting antennas #1~#N with the same frequency. In a receiver side, signals received at plural antennas #1~#M are signal-separated (Step S12) and parallel-to-serial converted to recover the information. In the MIMO multiple system, since a large amount of different pieces of information can be transmitted at the same time, it is possible to drastically increase information bit rates. Data flow A~D when two antennas are used is schematically shown in (b).

FIG. 7 shows two types of MIMO multiple systems. In one type shown in (a), two transmission data signals (transmission streams) #1, #2 are transmitted via transmitting antennas #1, #2, respectively. In another type shown in (b), transmission data signals (transmission streams) #1, #2 are weighted by $w_{1,1}$, $w_{1,2}$, $w_{2,1}$, $w_{2,2}$, and transmitted via the transmission antennas #1, #2 to obtain antenna beam patterns as shown in (b). The present invention can be applied to both. types.

FIGS. 8~10 show some conventional technologies employing the AMC and the hybrid ARQ in the MIMO multiple system (for example see LGE, "Multiplexing Chain for MIMO System," 3GPP TSG RAN WG1, R1-040259, Malagua, Spain, February 2004).

FIG. 8 is a first conventional example of a transmission frame generating unit in the MIMO multiple system. As shown in (a), the transmission frame generating unit has a transmission stream #1 comprising a packet data block generator 101-1, a CRC adder 102-1, a channel encoder 103-1, a coding rate changer 104-1, an interleaver 105-1 and a data modulator 106-1, which are connected in series. The transmission frame generating unit has another transmission stream #2 comprising a packet data block generator 101-2, a CRC adder 102-2, a channel encoder 103-2, a coding rate changer 104-2, an interleaver 105-2 and a data modulator 106-2, which are connected in series. The transmission streams #1 and #2 are arranged in parallel. This transmission frame generating unit has features as shown in (b).

FIG. 9 is a second conventional example of a transmission frame generating unit in the MIMO multiple system. As shown in (a), the transmission frame generating unit, comprises a packet data block generator 101, a CRC adder 102, a channel encoder 103 and a coding rate changer 104. After these functions, the data stream is separated by a serial-to-parallel converter 107 into two streams #1 and #2, which have interleavers 105-1, 105-2 and data modulators 106-1, 106-2, respectively. This frame generating unit has features shown in (b).

FIG. 10 is a third conventional example of a transmission frame generating unit in the MIMO multiple system. As shown in (a), the transmission frame generating unit comprises a packet data block generator 101, a CRC adder 102 and a channel encoder 103. After these functions, the data stream is separated by a serial-to-parallel converter 107 into two streams #1 and #2, which have coding rate changers 104-1, 104-2, interleavers 105-1, 105-2, and data modulators 106-1, 106-2, respectively. This frame generating unit has features shown in (b).

The above mentioned conventional examples shown in FIGS. 8~10 have problems discussed below.

In the MIMO multiple system, each transmission stream has different channel conditions, and therefore the AMC can be separately performed per each transmission stream to obtain better reception properties (throughput, packet error rate) than common transmission stream processing. With regards of this point, the first conventional example shown in FIG. 8 and the third conventional example shown in FIG. 10 are satisfactory, but the second conventional example shown in FIG. 9 does not allow the channel coding rate change to be separately controlled per transmission stream.

In the MIMO multiple system, the channel coding and the hybrid ARQ over individual transmission streams are preferable from the viewpoint of increasing the diversity effect at channel decoding. With respect to this point, the second conventional example shown in FIG. 9 and the third conventional example shown in FIG. 10 are satisfactory, but the first conventional example shown in FIG. 8 cannot realize the diversity effect.

The larger the packet data block size becomes, the larger the wastefulness in resending a packet in response to reception error becomes with respect to this point, the second conventional example shown in FIG. 9 and the third conventional example shown in FIG. 10 are disadvantageous.

Further, when the channel coding speed is fast, the work load in the receiver side becomes heavy. With respect to this point, the second conventional example shown in FIG. 9 and the third conventional example shown in FIG. 10 are disadvantageous.

SUMMARY OF THE INVENTION

The present invention may provide a MIMO multiple transmission device and method in which the AMC and the hybrid ARQ can be adequately performed, the wastefulness in resending packet data blocks is small, and the channel decoding work load in the receiver side is small.

In a preferred embodiment of the present invention is provided a MIMO multiple transmission device, comprising: a packet data block generator (111) for generating a packet data block as a resent unit for hybrid ARQ; a CRC adder (112) for adding an error detection code; a channel encoder (113) for performing channel encoding, the packet data block generator, the CRC adder and the channel encoder being coupled in series in one or more data streams; a parallel-to-serial converter (114) for converting output of the channel encoder to serial form; an interleaver between transmission streams (115) for performing interleaving between transmission streams on outputs from the parallel-to-serial converter; a serial-to-parallel converter (116) for converting outputs from the interleaver between transmission streams to parallel form; a coding rate changer (117) for changing a coding rate; and a data modulator (119) for modulating data, the coding rate changer and the data modulator being connected in series in plural data streams divided by the serial-to-parallel converter.

In another embodiment of the present invention is provided a MIMO multiple transmission device, comprising: a packet data block generator (111) for generating a packet data block as a resent unit for hybrid ARQ; a CRC adder (112) for adding an error detection code; a channel encoder (113) for performing channel encoding, the packet data block generator, the CRC adder and the channel encoder being coupled in series in one or more data streams; a parallel-to-serial converter (114) for converting output of the channel encoder to serial form; an interleaver between transmission streams (115) for performing interleaving between transmission streams on outputs from the parallel-to-serial converter; a serial-to-parallel converter (116) for converting outputs from the interleaver between transmission streams to parallel form; a coding rate changer (117) for changing a coding rate; and a data modulator (119) for modulating data, the coding rate changer and the data modulator being connected in series in plural data streams divided by the serial-to-parallel converter; all the above elements being provided for each of plural user data streams; further comprising plurals multiplexers of users (132), each of which combines outputs from the plural data modulators per each of the transmission streams.

In further another embodiment of the present invention is provided a MIMO multiple transmission method, comprising the steps of: generating a packet data block; adding an error detection code; performing channel encoding, the above steps being sequentially performed in one or more data streams; converting output after the channel encoding step to serial form; performing interleaving between transmission streams on outputs after the converting step; converting outputs after the interleaving step to parallel form; changing a coding rate; and modulating data, the coding rate changing step and the data modulating step being sequentially performed in plural data streams divided by the converting-to-parallel step.

According to the embodiments of the present invention, a MIMO multiple transmission device and method are provided in which the AMC and the hybrid ARQ can be adequately performed, the wastefulness in resending packet data blocks is small, and the channel decoding work load in the receiver side is small.

BRIEF DESCRIPTION OF THE DRAWINGS

FIG. 7 shows two types of MIMO multiple systems;

FIG. 21 shows examples of symbol arrangement in OFDM for multiplexing plural users' data;

FIG. 22B is a block diagram of a first receiver corresponding to the transmitter according to the present invention.

DESCRIPTION OF THE PREFERRED EMBODIMENTS

The following is a description of embodiments of the present invention, with reference to the accompanying drawings.

Throughout all the figures, members and parts having the same or similar functions are assigned the same or similar reference signs, and redundant explanations are omitted.

Figure 1:
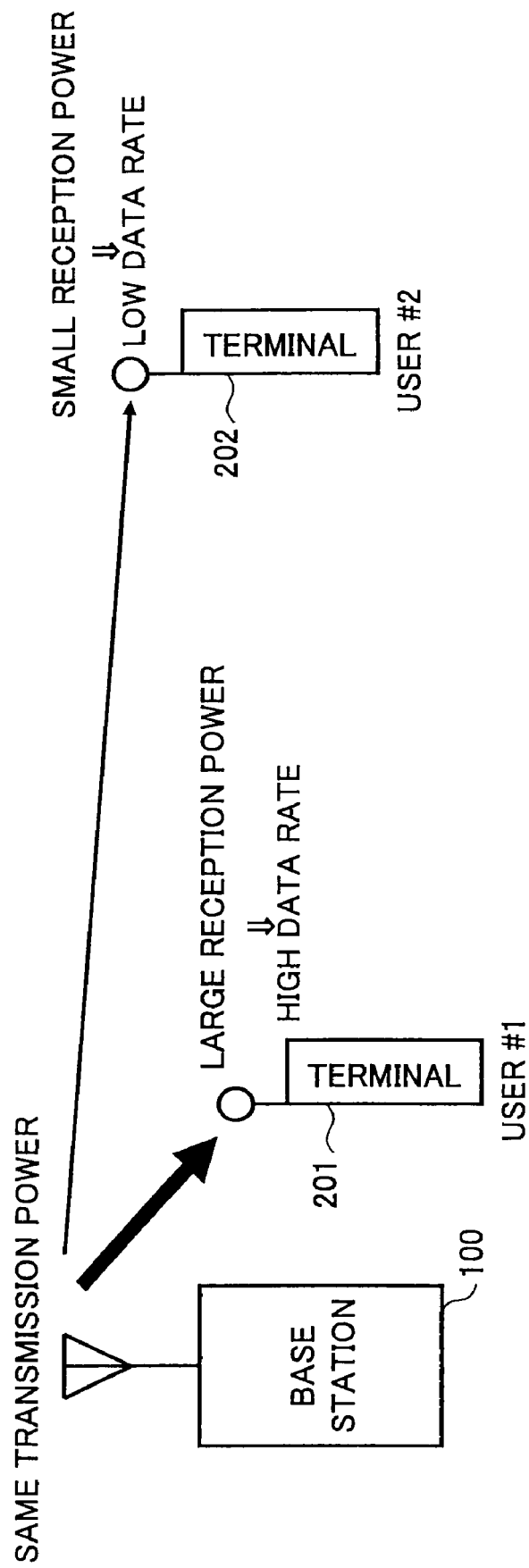
FIG. 1 is a conceptual diagram of a general adaptive modulation and channel coding (AMC) system.
Figure 2:
FIG. 2 is a chart showing combinations of data modulation systems and channel coding rates.
Figure 3:
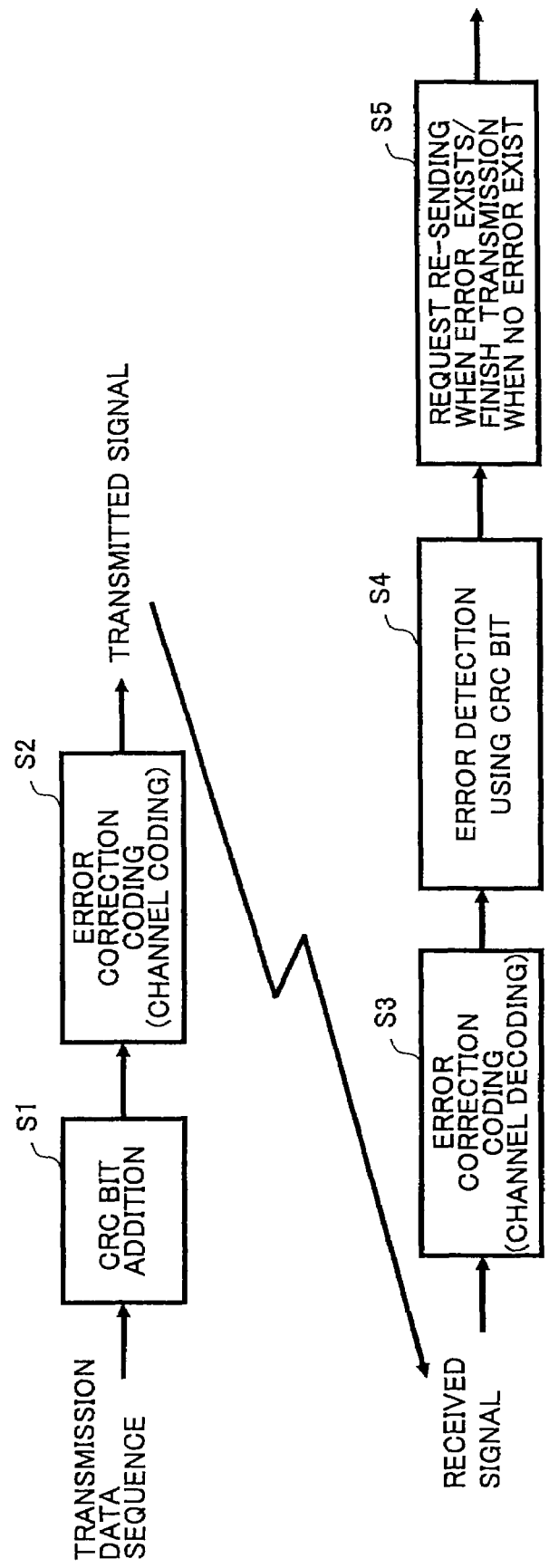
FIG. 3 shows procedures of a general hybrid ARQ system.
Figure 4:
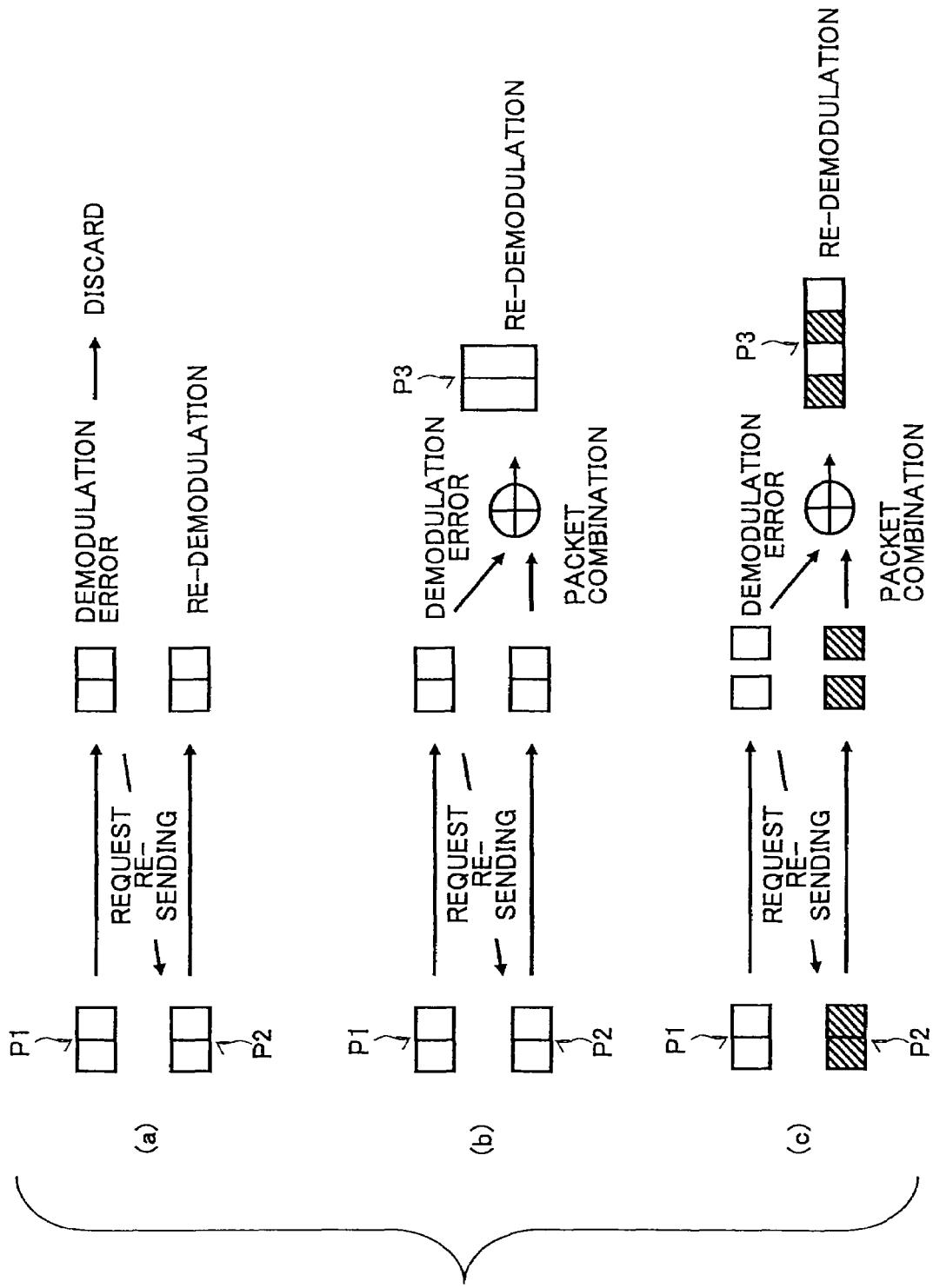
FIG. 4 shows three processing types (a), (b) and (c) in the hybrid ARQ.
Figure 5:
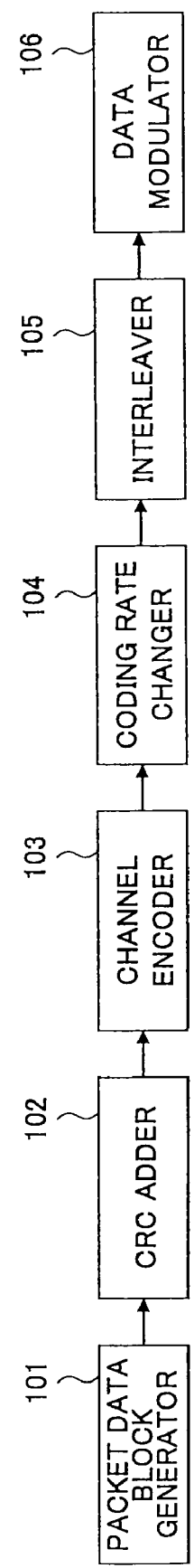
FIG. 5 shows a structure of one antenna transmission frame generating unit.
Figure 6:
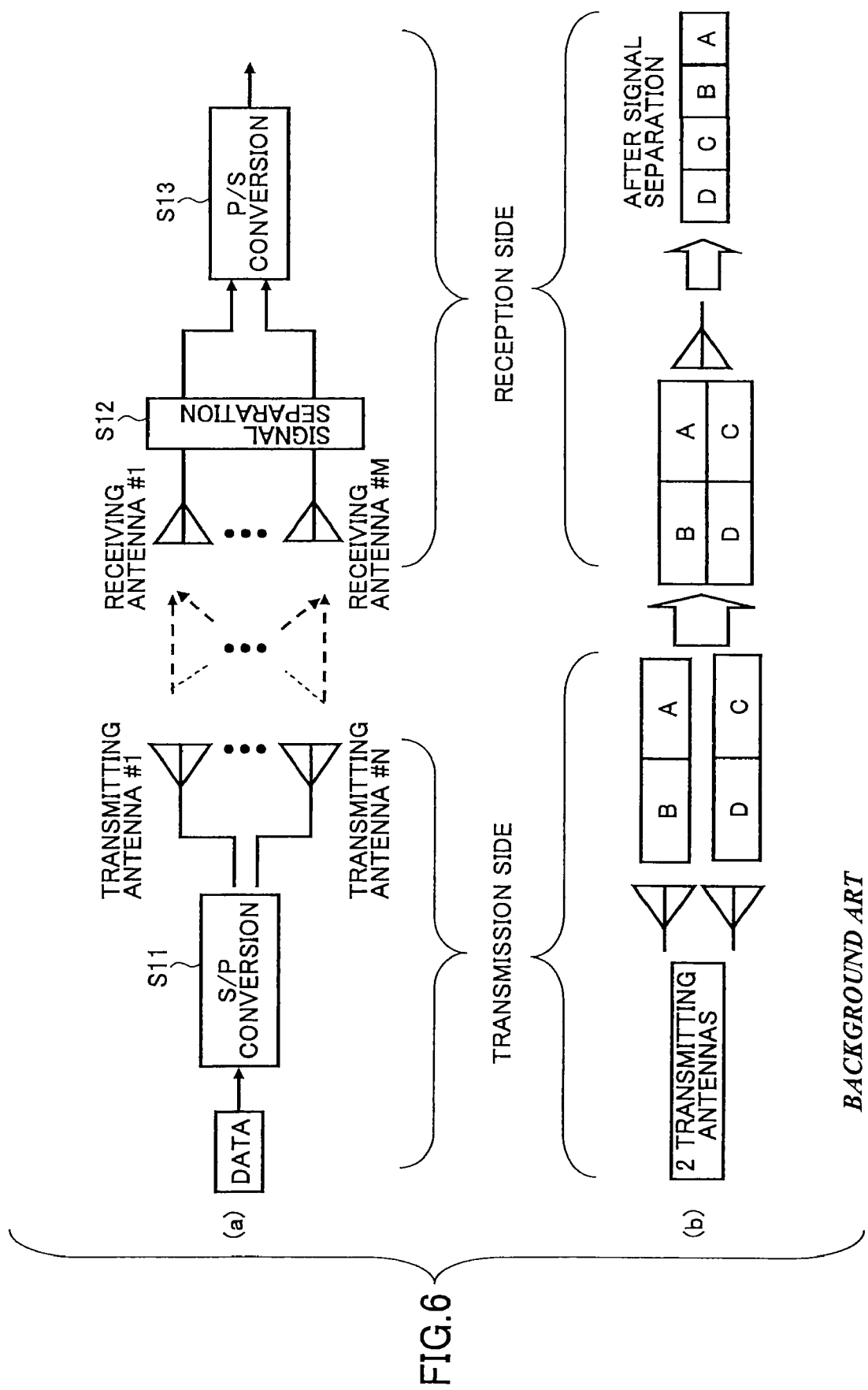
FIG. 6 schematically shows the concept of MIMO multiple systems.
Figure 8:
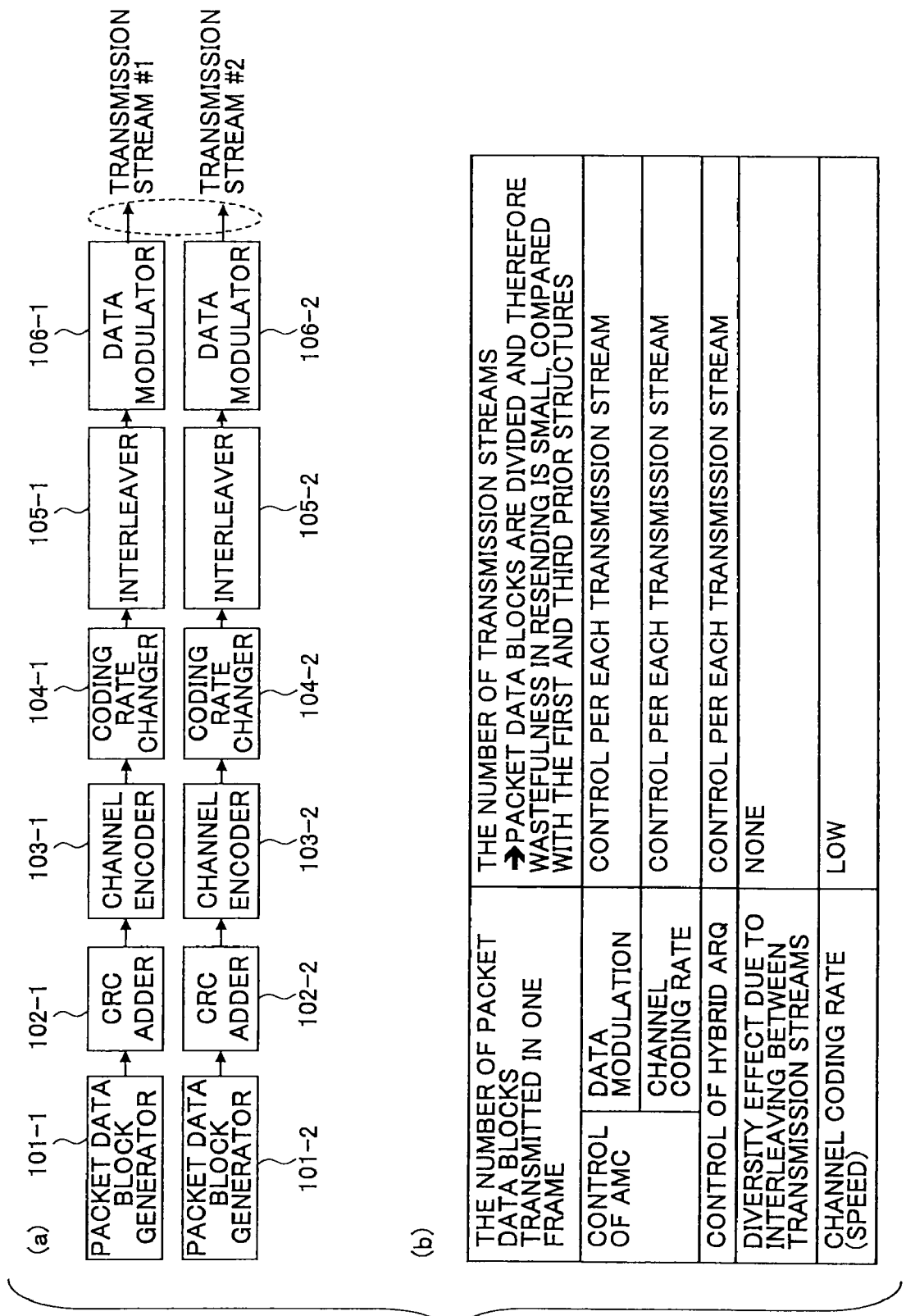
FIG. 8 is a first conventional example of a transmission frame generating unit in the MIMO multiple system.
Figure 9:
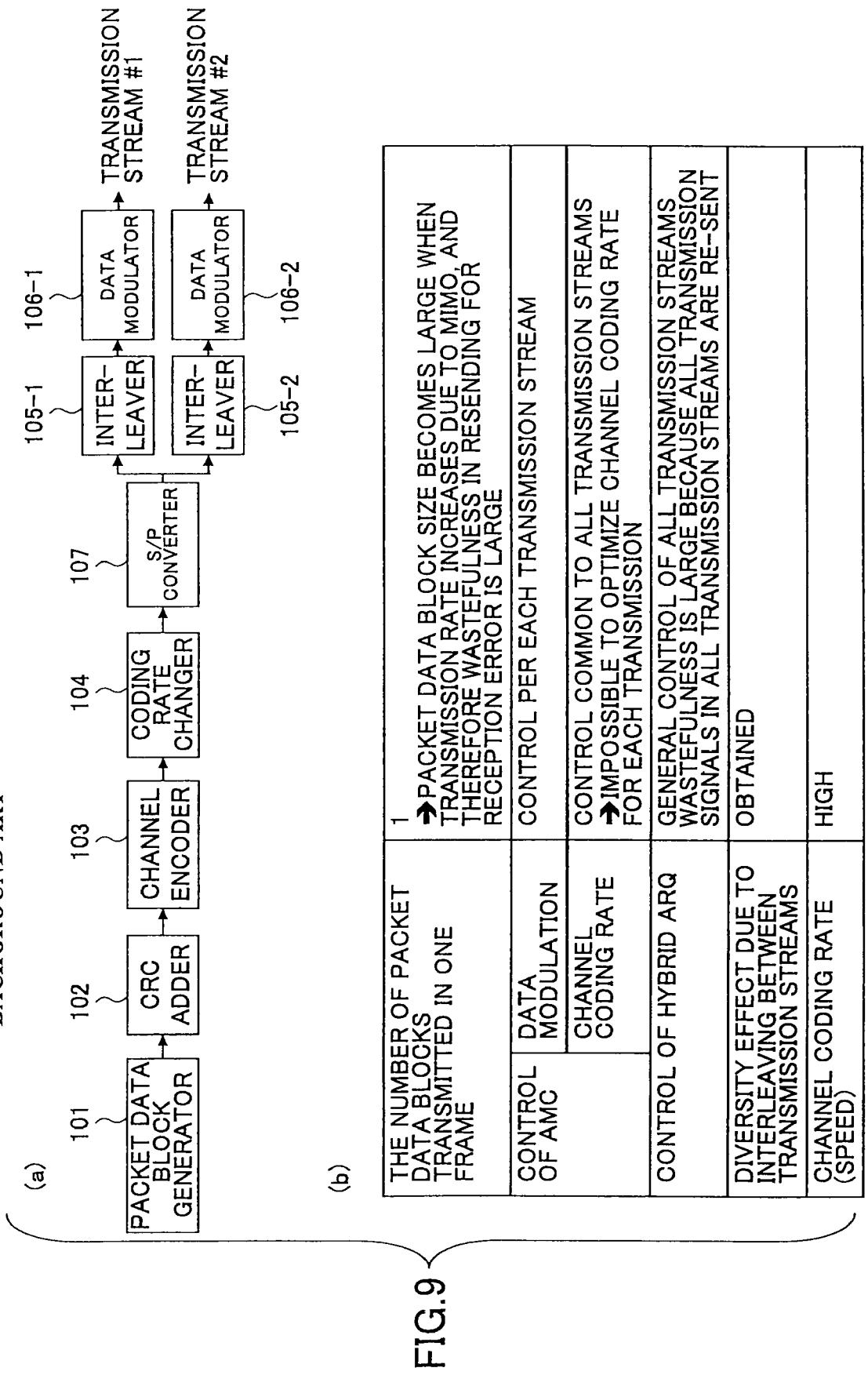
FIG. 9 is a second conventional example of a transmission frame generating unit in the MIMO multiple system.
Figure 10:
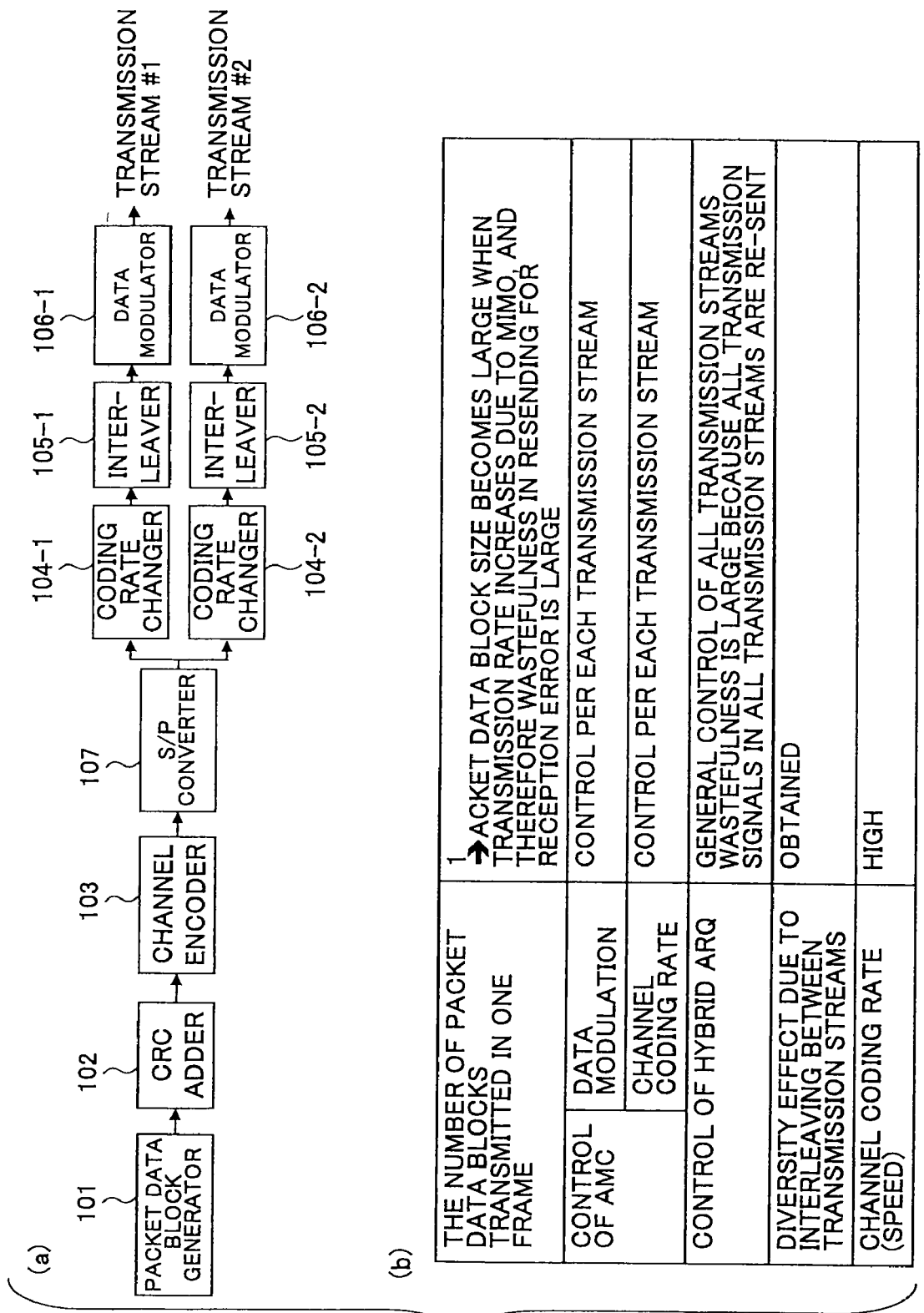
FIG. 10 is a third conventional example of a transmission frame generating unit in the MIMO multiple system.
Figure 11:
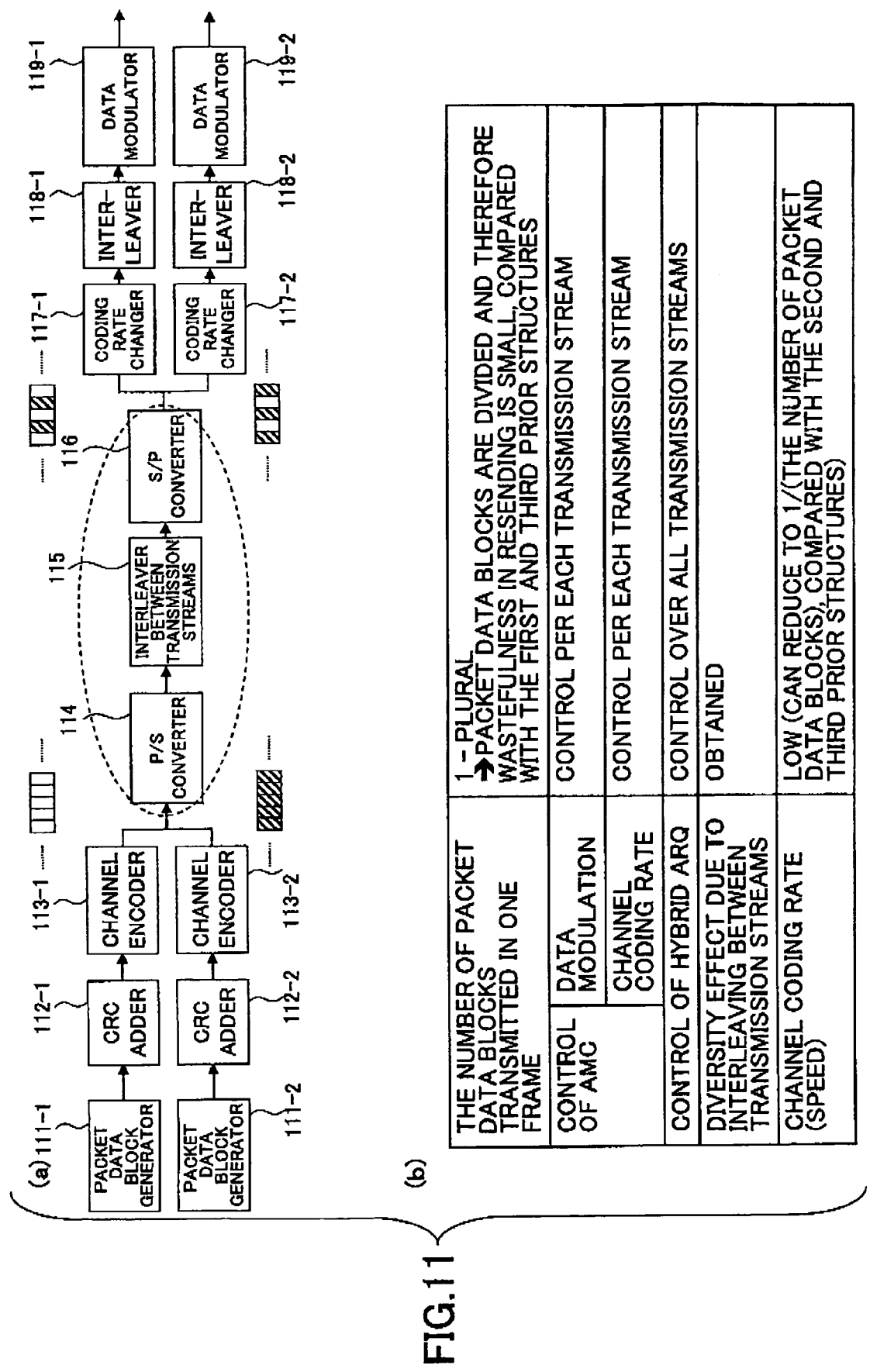
FIG. 11 is a transmission frame generating unit according to a first embodiment of the present invention.

FIG. 11 is a transmission frame generating unit according to a first embodiment of the present invention. As shown in (a), two upper streams of the transmission frame generating unit comprise packet data block generators 111-1, 111-2 for generating a packet data block as a resending unit in the hybrid ARQ, CRC adders 112-1, 112-2 for adding error detection code, channel encoders 113-1, 113-2 for performing channel encoding in series, respectively. The number of streams may alternatively be one or any number more than two.

The transmission frame generating unit further comprises a parallel-to serial converter 114 for converting the outputs from the channel encoders 113-1, 113-2 to serial form, an interleaver between transmission streams 115 for interleaving the outputs from the parallel-to-serial converter 114 by changing the order of transmission streams, and a serial-to-parallel converter 116 for converting the outputs from the interleaver between transmission streams 115 to parallel form.

The two streams separated by the serial-to-parallel converter 116 of the transmission frame generating unit comprise coding rate changers 117-1, 117-2, interleavers between transmission streams 118-1, 118-2, and data modulators 119-1, 119-2, respectively. The coding rate changers 117-1, 117-2 change a coding rate by level matching (puncture, repetition), and control repetition and puncture when resending in the hybrid ARQ. The interleavers 118-1, 118-2 interleave by changing the order of transmission streams (including frequencies in the OFDM). The data modulators 119-1, 119-2 modulate data. Two transmission streams are shown here, but the number of transmission streams is not limited to that.

FIG. 11(b) illustrates features of the above embodiment. As for the AMC, since the data modulators 119-1, 119-2, and the channel coding rate changers 117-1, 117-2 are provided in the corresponding transmission streams, adequate control can be separately performed for each transmission stream in accordance with channel conditions in the corresponding transmission stream. As for the hybrid ARQ, since the CRC adders 112-1, 112-2, and the channel encoders 113-1, 113-2 are provided over the corresponding streams, the diversity effect can be expected due to the interleaving between transmission streams.

Since plural packet data block generating units 111-1, 111-2 generate packet data blocks as a resending unit in the hybrid ARQ, the wastefulness in resent packet data blocks is small. Further, since the channel encoders 113-1, 113-2 perform channel coding in these streams, the work load in a receiver side due to channel demodulation is small.

Figure 12:
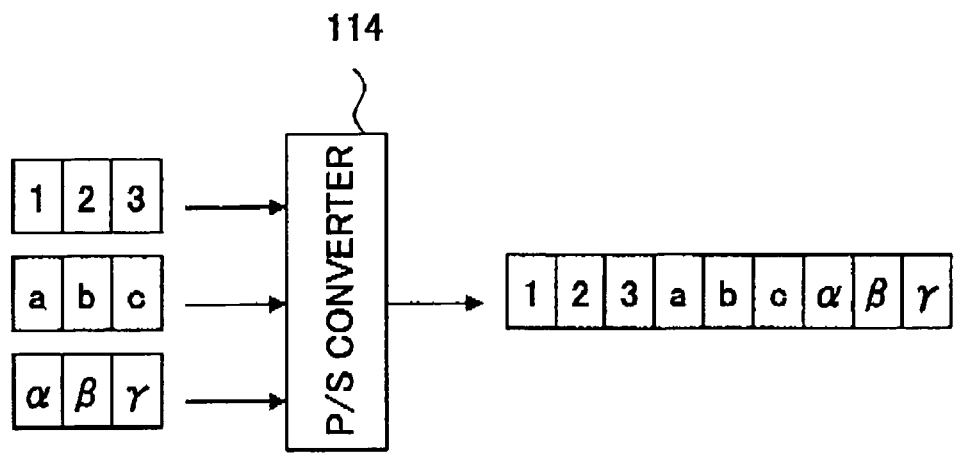
FIG. 12 illustrates operations of a parallel-to-serial converter.
Figure 13:
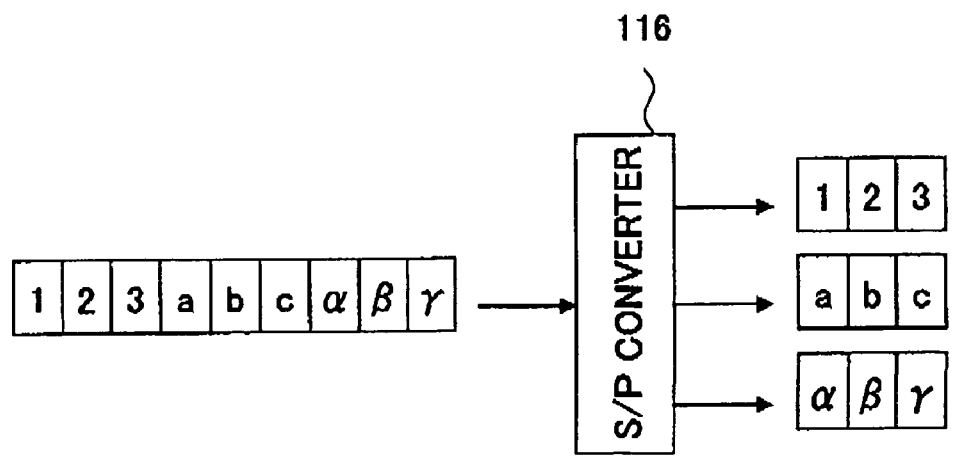
FIG. 13 illustrates operations of a serial-to-parallel converter.

FIG. 12 illustrates an operational example of the parallel-to-serial converter 114. Packet data blocks input in parallel are converted to serial form. FIG. 13 illustrates an operational example of the serial-to-parallel converter 116. Serially input packet data blocks are converted to parallel form.

Figure 14:
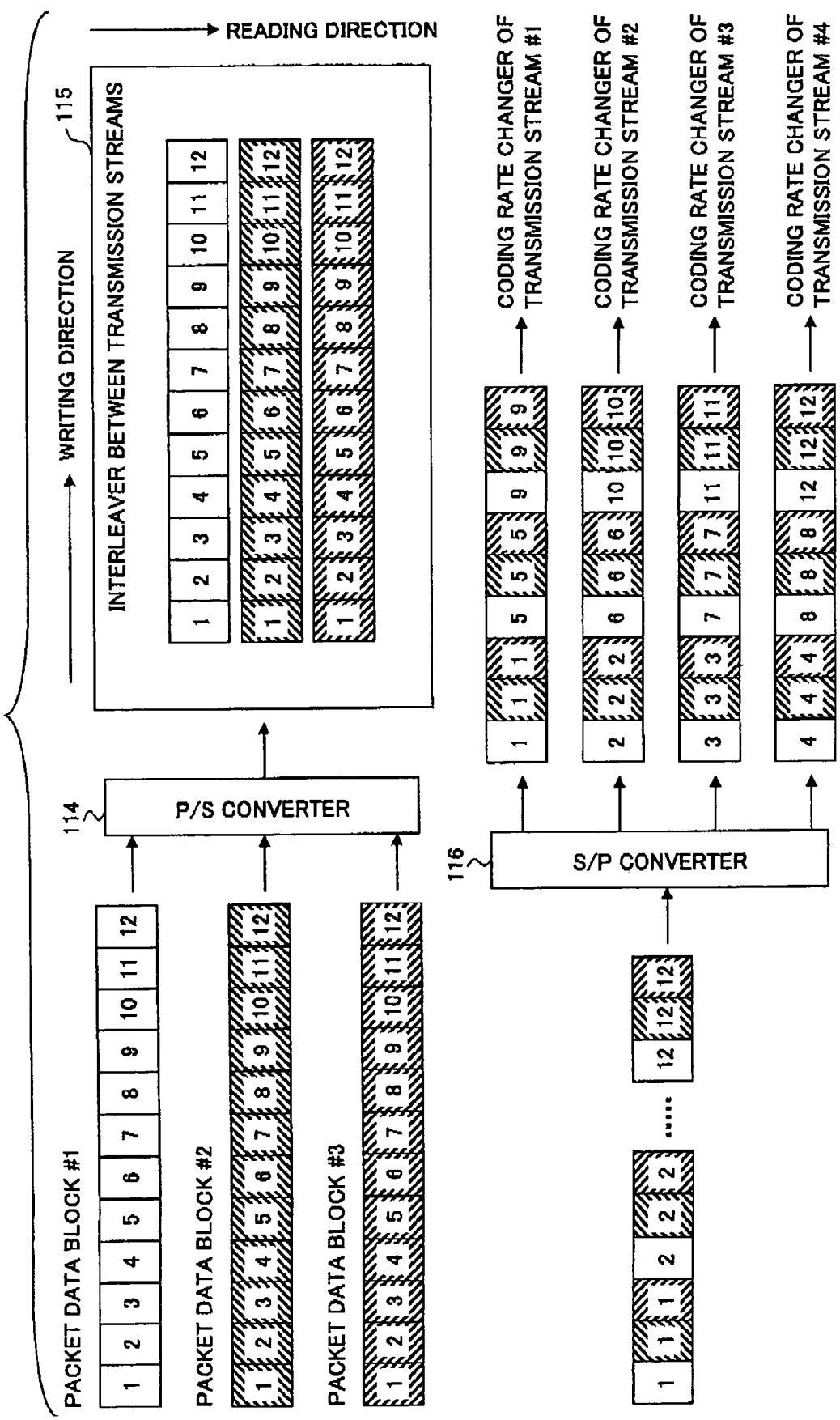
FIG. 14 illustrates operations of interleaving between transmission streams.

FIG. 14 illustrates an operational example of the interleaver between transmission streams 115. Packet data blocks #1~#3 are converted by the parallel-to-serial converter 114 to a serial packet data sequence, which is written into a memory region in the interleaver between transmission streams 115. The interleaver between transmission streams 115 reads out packet data sequentially across plural packet data blocks. The read packet data sequence is converted by the serial-to-parallel converter 116 to parallel form, the transmission streams of which are given to the coding rate changers 117-1, 117-2, respectively.

Figure 15:
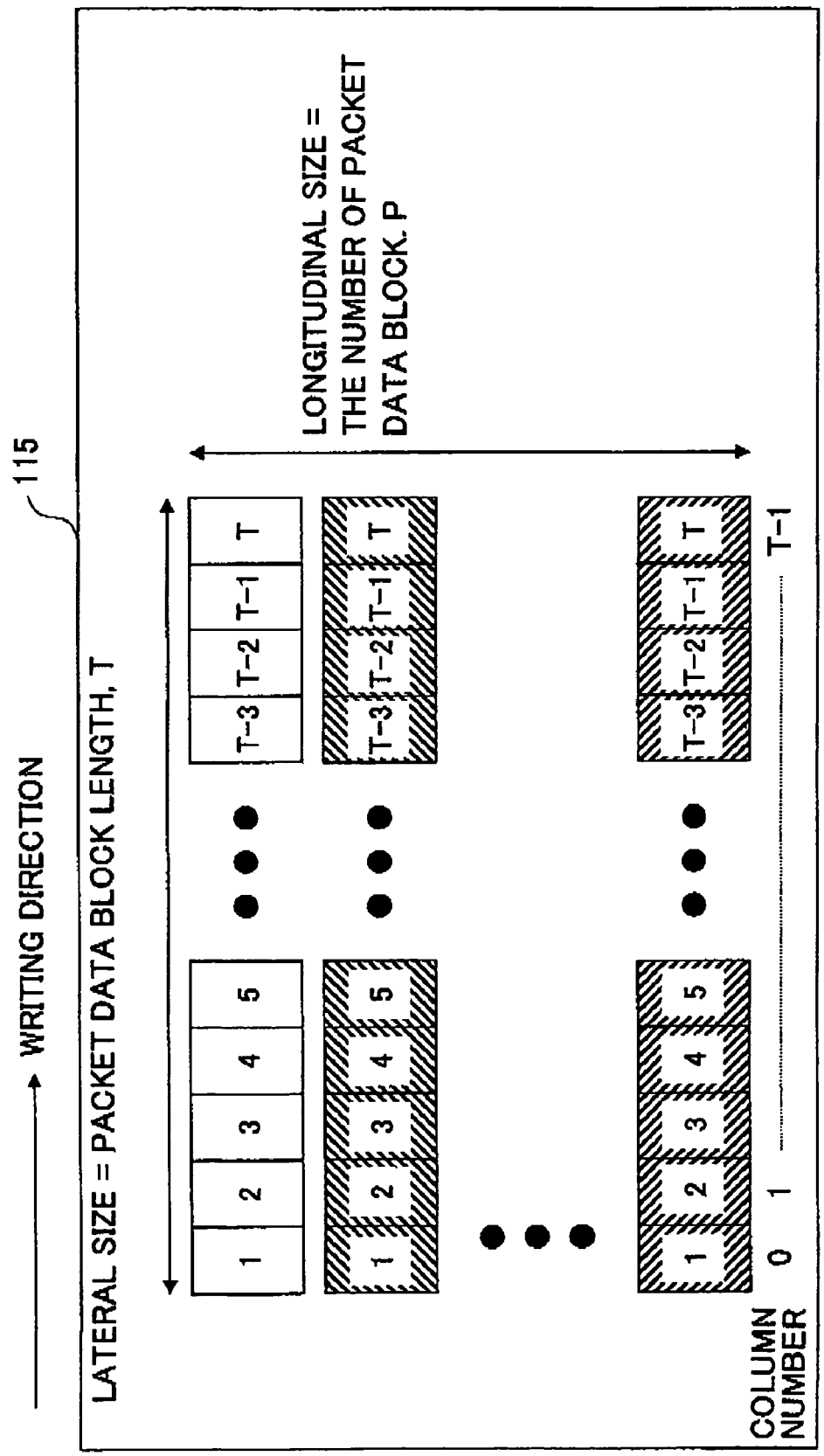
FIG. 15 shows in detail an interleaver between transmission streams using block interleaving.

FIG. 15 shows in detail the interleaver between transmission streams 115 using a block interleaver. The lateral (left-right) size is a packet data block length T. The vertical (up-down) size is the number P of packet data blocks. The positions of the read packet data can be identified with column numbers 0~T-1. Writing is performed in the lateral direction per packet data block. Reading is performed in the vertical direction from upper to lower. First, the least column number in the columns satisfying the following equation is read.

[Column number] mod [the number N of transmission streams]=0

Next, the least column number in the columns satisfying the following equation is read.

[Column number] mod [the number N of transmission streams]=1

These reading procedures are repeated. Last, all the columns satisfying the following equation are read and then the reading procedures are finished.

[Column number] mod [the number $N$ of transmission streams]=$N$−1

Mod means a remainder operation, that is A mod B means the remainder of A divided by B.

Figure 16:
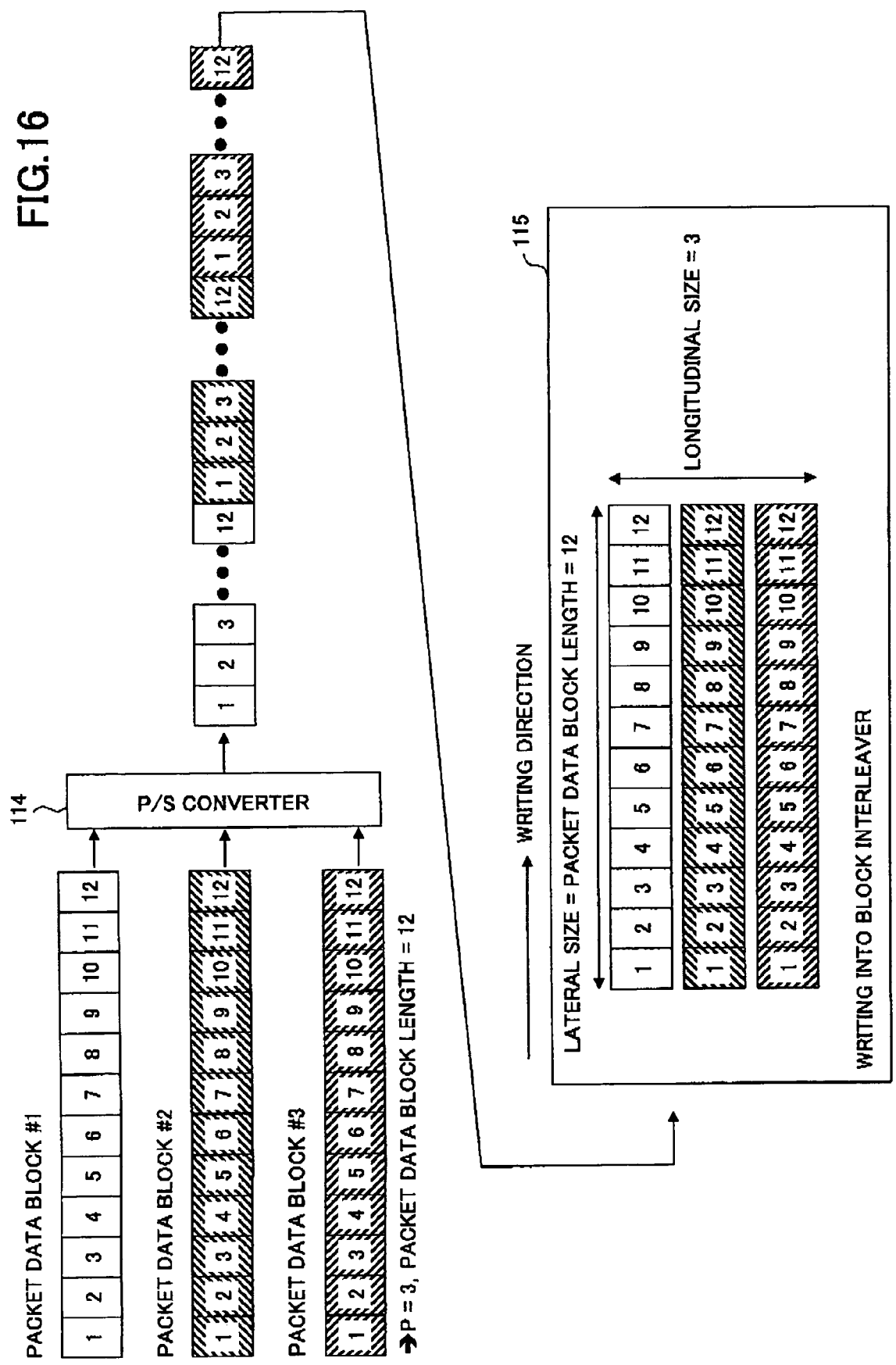
FIG. 16 shows operations of writing packet data blocks into the interleaver between transmission streams.

FIG. 16 illustrates an operational example of writing packet data blocks into the interleaver between transmission streams 115. In this example, a packet data block length T is 12 and the number P of packet data blocks is 3.

Figure 17:
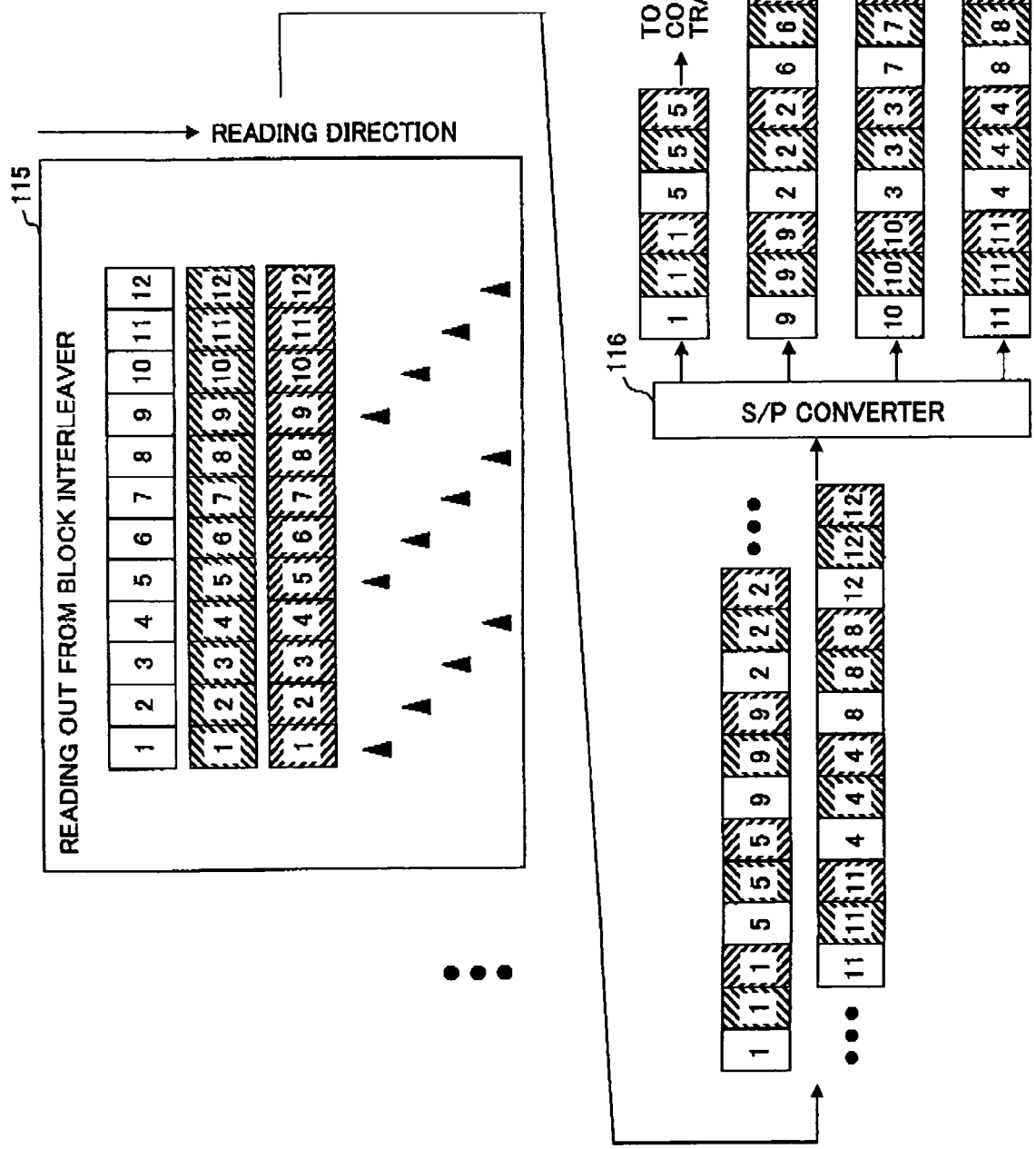
FIG. 17 shows operations of reading out packet data blocks from the interleaver between transmission streams.

FIG. 17 illustrates an operational example of reading out packet data blocks from the interleaver between transmission streams 115. Reading is performed in the vertical direction from upper to lower sequentially in each of column positions indicated by black triangles in FIG. 17. The read packet data sequence is converted by the serial-to-parallel converter 116 to plural streams. Each of the streams has a specific length (length 6 for #1 stream, 9 for #2, 9 for #3, 12 for #4) and is given to the corresponding coding rate changer.

Figure 18:
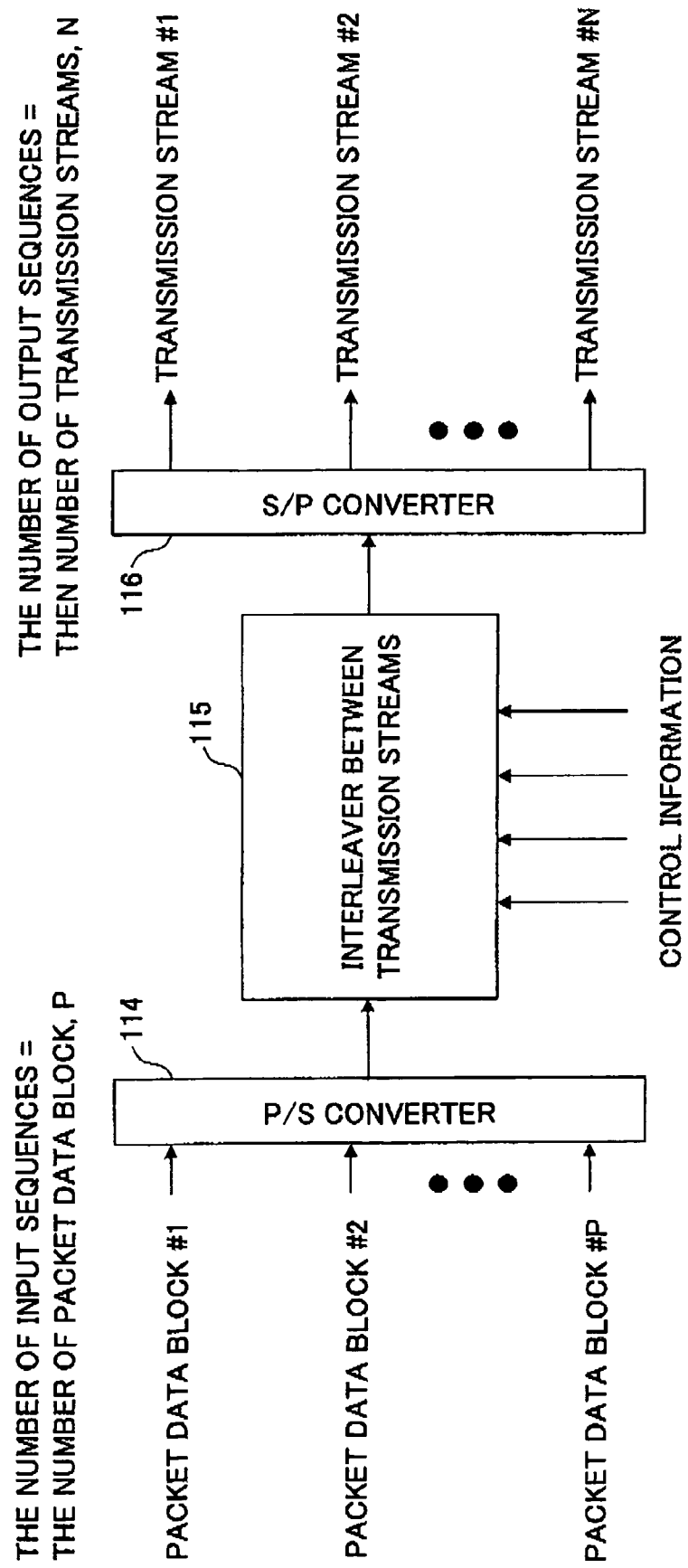
FIG. 18 shows another structure of an interleaver between transmission streams.

FIG. 18 illustrates another example of the interleaver between transmission streams 115, in which writing and reading operations can be controlled based on control information. The control information includes the number P of packet data blocks, packet data block length T, the number N of transmission streams, etc.

Figure 19A:
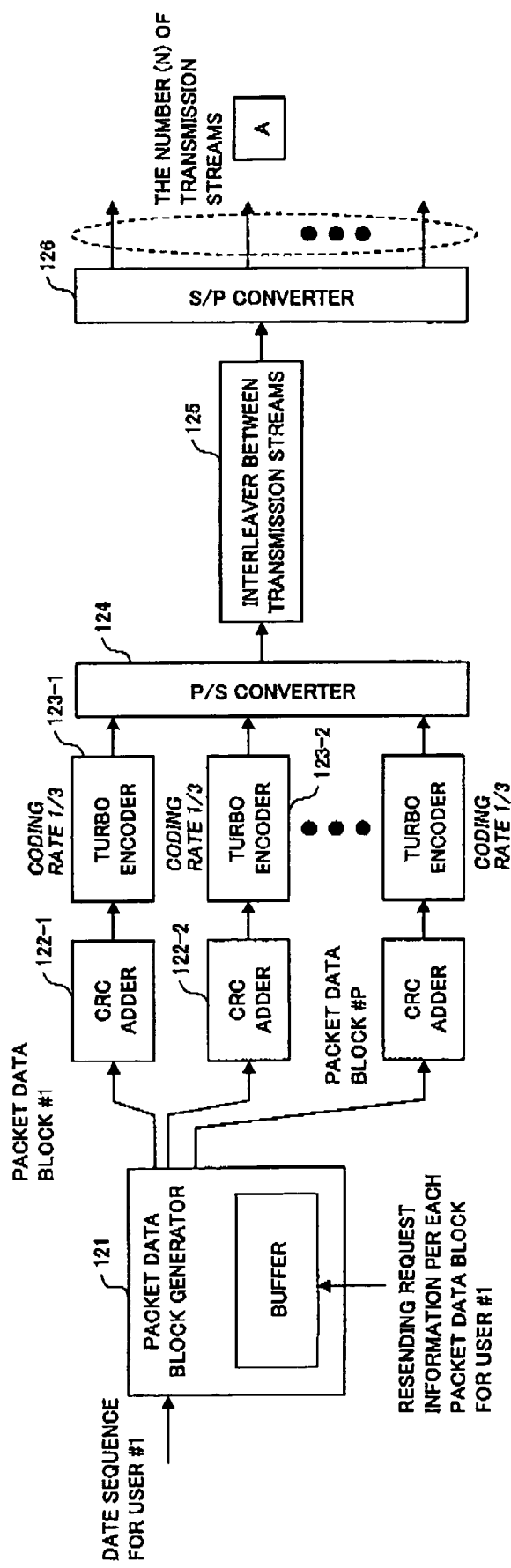
FIG. 19A is a block diagram of a first structure of a transmitter according to the present invention.
Figure 19B:
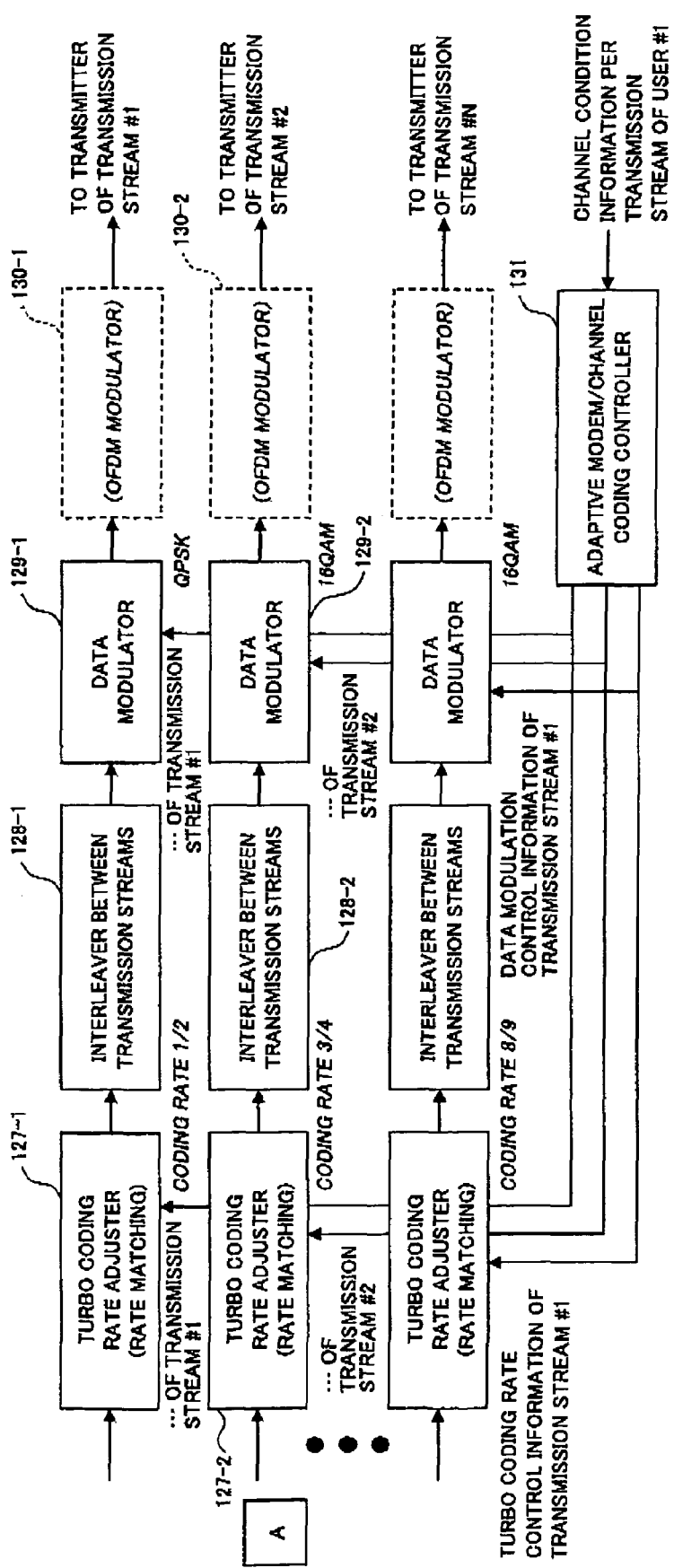
FIG. 19B is a block diagram of a second structure of a transmitter according to the present invention.

FIGS. 19A and 19B show two embodiments of a transmitter (MIMO multiple transmitter) according to the present invention. A packet data block generating unit 121 shown in FIG. 19A corresponds to the packet data block generating units 111-1, 111-2 shown in FIG. 11. CRC adders 122-1, 122-2 shown in FIG. 19A correspond to the CRC adders 112-1, 112-2 shown in FIG. 11. Turbo encoders 123-1, 123-2 shown in FIG. 19A correspond to the channel encoders 113-1, 113-2 shown in FIG. 11. A parallel-to-serial converter 124, an interleaver between transmission streams 125 and a serial-to-parallel converter 126 shown in FIG. 19A correspond respectively to the parallel-to-serial converter 114, the interleaver between transmission streams 115 and the serial-to-parallel converter 116 shown in FIG. 11.

Turbo coding rate adjusters 127-1, 127-2 shown in FIG. 19B correspond to the coding rate changers 117-1, 117-2 shown in FIG. 11. Interleavers between transmission streams 128-1, 128-2 shown in FIG. 19B correspond to the interleavers between transmission streams 118-1, 118-2 shown in FIG. 11. Data modulators 129-1, 129-2 shown in FIG. 19B correspond to the data modulators 119-1, 119-2 shown in FIG. 11. OFDM modulators 130-1, 130-2 perform the OFDM modulation, but are not needed when the OFDM modulation is not employed. An adaptive modem/channel coding controller 131 controls the turbo coding rate and adjuster 127-1, 127-2, . . . and the data modulators 129-1, 129-2, . . . separately based on channel condition information per each of transmission stream.

Figure 20:
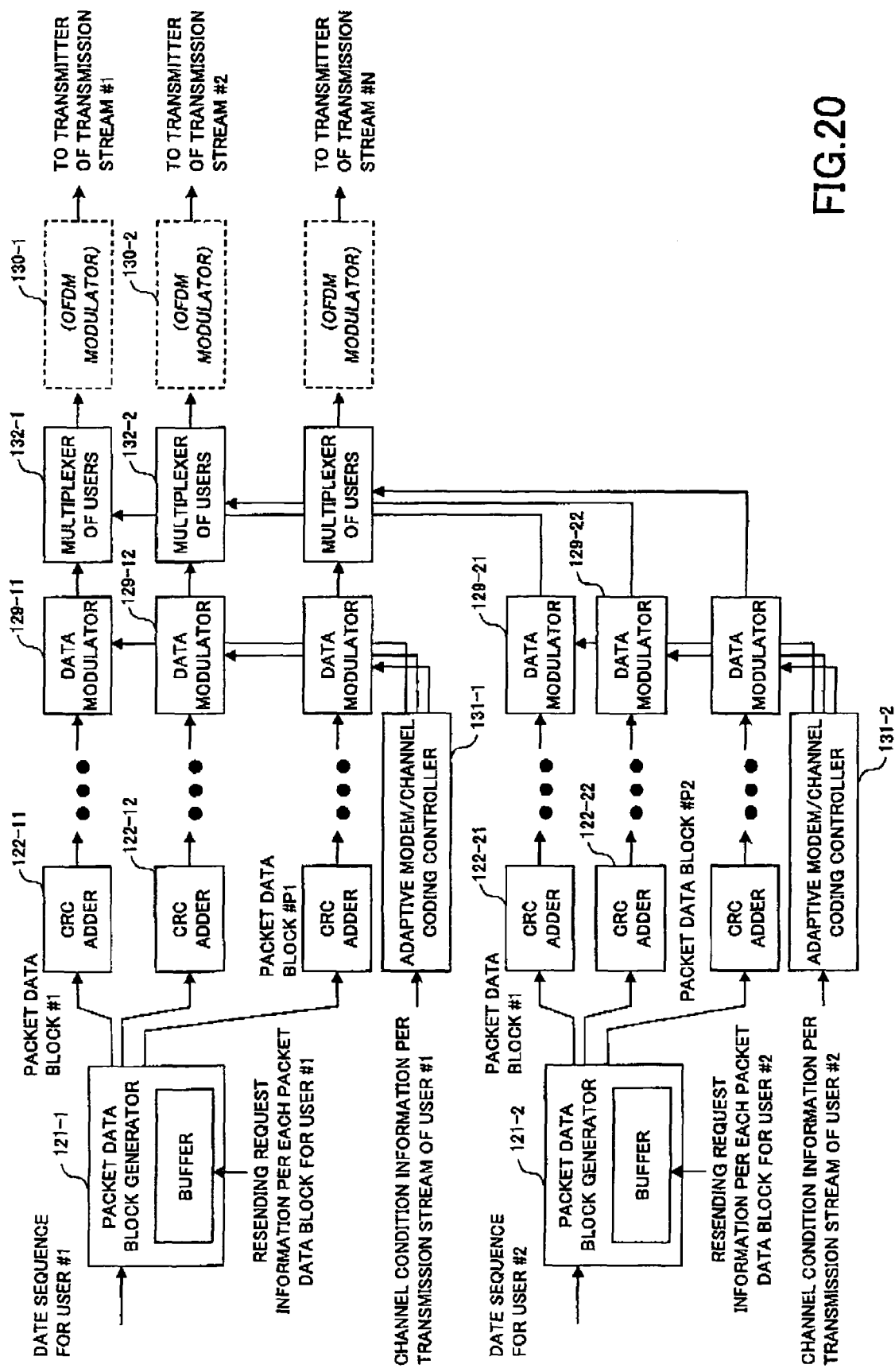
FIG. 20 is a block diagram of a transmitter for multiplexing plural users' data.

FIG. 20 shows a structure example of a transmitter for multiplexing plural user data streams. A structure the same as from the packet data block generating unit 121 to the data modulators 129-1, 129-2, . . . , is provided for each user. Multiplexer of users 132-1, 132-2, . . . , provided after the data modulators 129-1, 129-2, . . . , multiplex the modulated data per each stream.

FIG. 21 illustrates symbol arrangement examples in the OFDM for multiplexing plural users. As shown in (a)~(d), the symbols of users' transmission data sequences are arranged in the same positions in plural transmission streams #1~#3. In this manner,. the same users are placed at the same places in all the transmission streams, and accordingly it is possible to avoid property degradation due to signal separation between different users, and complex processing for received signals.

Figure 22A:
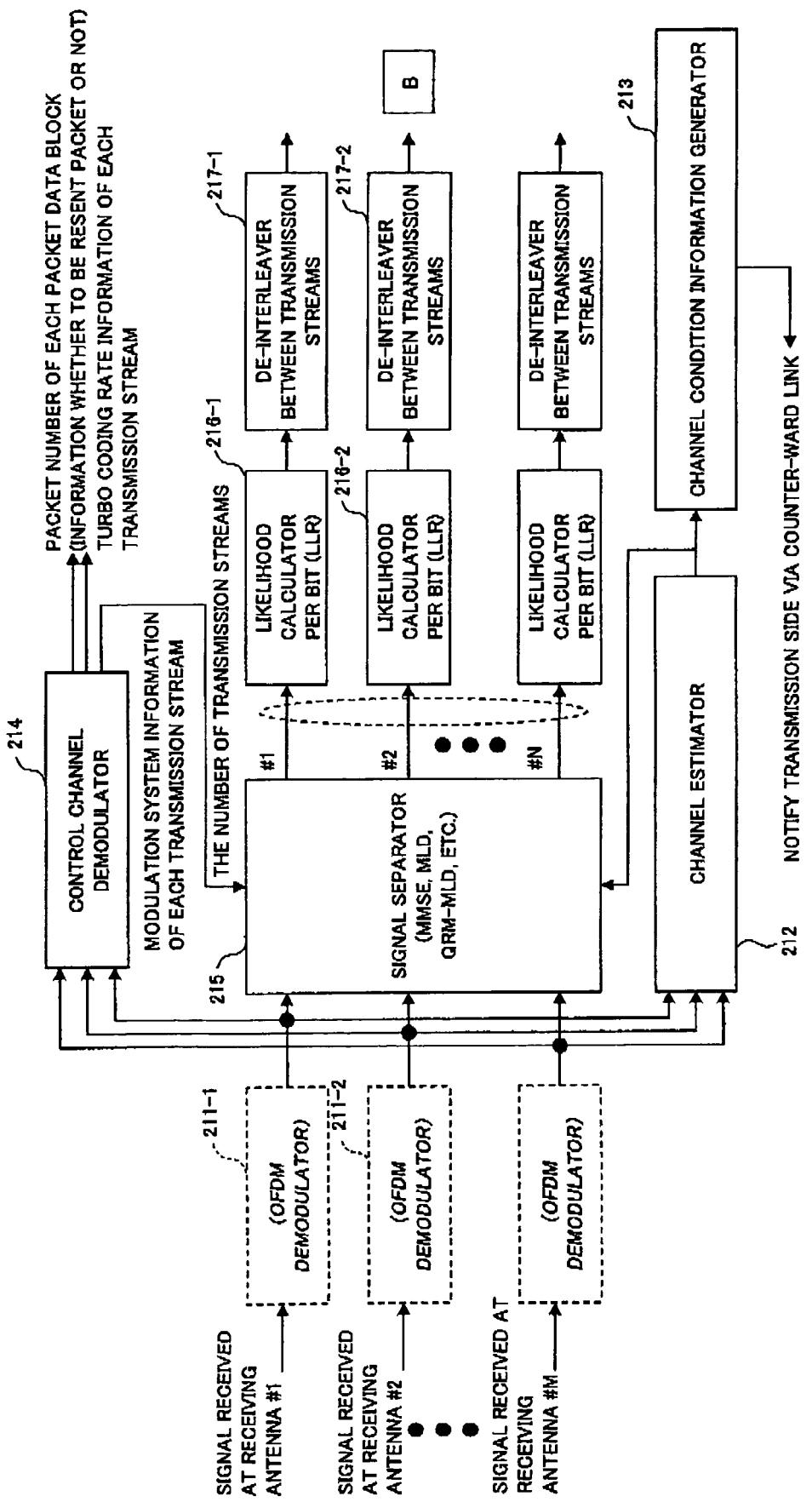
FIG. 22A is a block diagram of a first receiver corresponding to the transmitter according to the present invention.

FIGS. 22A and 22B show an example of a receiver corresponding to a transmitter according to the present invention. The receiver shown in FIGS. 22A and 22B comprises OFDM demodulators 211-1, 211-2, . . . , a channel estimator 212, a channel condition information generator 213, a control channel demodulator 214, a signal separator 215, likelihood calculators per bit 216-1, 216-2, . . . , and de-interleavers between transmission streams 217-1, 217-2, . . . The OFDM demodulators 211-1, 211-2, . . . perform the OFDM demodulation on signals received at each antenna. The OFDM demodulators are not needed if the OFDM modulation is not employed. The channel estimator 212 performs channel estimation for each transmission stream based on pilot signal included in the received signal. The channel condition information generator 213 generates channel condition information per each transmission stream for the adaptive modulation/channel coding, and notify the transmitter of it via a counter link. The control channel demodulator 214 demodulates a control channel from the received signal. The signal separator 215 separates a signal (data) from the received signal in accordance with the channel estimation given by the channel estimator 212 and modulation system information given by the control channel demodulator 214. The likelihood calculators per bit 216-1, 216-2, . . . calculates the likelihood of each bit based on the signal per transmission stream of the signal separator 215. The de-interleavers between transmission streams 217-1, 217-2, . . . perform de-interleaving between transmissions based on outputs from the likelihood calculator per bit.

The receiver shown in FIGS. 22A and 22B further comprises a parallel-to-serial converter 218, a de-interleaver between transmission streams 219, a serial-to-parallel converter 220, packet combiners 221-1, 221-2, . . . , a buffer 222, turbo decoders 223-1, 223-2, . . . , a CRC checkers 224-1, 224-2, . . . , and a packet data block combiner 225. The parallel-to-serial converter 218 converts the outputs from the de-interleavers between transmission streams 217-1, 217-2, . . . to serial form. The de-interleavers between transmission streams 219 perform de-interleaving between transmission streams on outputs from the parallel-to-serial converter 218. The serial-to-parallel converter 220 converts outputs from the de-interleavers 219 to parallel form. The packet combiners 221-1, 221-2, . . . combines parallel packet data blocks only when resending, and does not combine them when not resending. The buffer 222 buffers packet data in accordance with information indicating whether to resend or not. The turbo decoders 223-1, 223-2, . . . decode outputs from the packet combiners 221-1, 221-2, . . . The CRC checker 224-1, 224-2, . . . checks CRC based on outputs from the turbo decoders 223-1, 223-2, . . . and notifies the transmitter if an error exists. The packet data block combiner 225 combines outputs from the turbo decoders 223-1, 223-2, . . . to recover the transmitted data sequence, and outputs the recovered data sequence.

The present application is based on Japanese Priority Application No. 2005-027733 filed on Feb. 3, 2005 with the Japanese Patent Office, the entire contents of which are hereby incorporated by reference.

What is claimed is:

1. A MIMO multiple transmission device having a plurality of upper data streams and a plurality of transmission streams, each of the upper data streams comprising:
   a packet data block generator for generating a packet data block as a resent unit for hybrid ARQ;
   a CRC adder coupled to an output of the packet data block generator, for adding an error detection code;
   a channel encoder coupled to an output of the CRC adder, for performing channel encoding;
   the MIMO multiple transmission device comprising:
   a parallel-to-serial converter for receiving parallel outputs which are each received from the channel encoder of each of the upper data streams, and converting the parallel outputs to serial form;
   an interleaver between transmission streams for performing interleaving on outputs from the parallel-to-serial converter;
   a serial-to-parallel converter for converting serial outputs from the interleaver between transmission streams to be outputted in parallel to the plurality of transmission streams;

each of the transmission streams comprising:
- a coding rate changer coupled to an output of the serial-to-parallel converter, for changing a coding rate; and
- a data modulator coupled to an output of the coding rate changer, for modulating data.

2. A MIMO multiple transmission device as claimed in claim 1,
further comprising:
plural multiplexers of users, each of which combines plural outputs which are each from the data modulator of each of the transmission streams.

3. The MIMO multiple transmission device as claimed in claim 2, wherein:
the multiplexers of users arrange symbols of the users' transmission sequences at the same positions in the different transmission streams.

4. The MIMO multiple transmission device as claimed in claim 1, further comprising:
an interleaver for interleaving between transmission streams, provided between the coding rate changer and the data modulator.

5. The MIMO multiple transmission device as claimed in claim 1, wherein:
the interleaver between transmission streams writes the packet data blocks in a memory region and sequentially reads out the packet data across the plural packet data blocks.

6. The MIMO multiple transmission device as claimed in claim 1, wherein:
the interleaver between transmission streams inputs the number of packet data blocks, a packet data block length or the number of transmission streams as control information.

7. The MIMO multiple transmission device as claimed in claim 1, wherein:
the channel encoder is a turbo encoder for performing turbo encoding.

8. The MIMO multiple transmission device as claimed in claim 1, wherein:
the coding rate changer is a turbo coding rate adjuster configured to adjust a turbo coding rate.

9. A MIMO multiple transmission method, implemented on a MIMO multiple transmission device having a plurality of upper data streams and a plurality of transmission streams, comprising:
in each of the plurality of upper data streams,
- generating, at a packet data block generator of the MIMO multiple transmission device, a packet data block as a resent unit for hybrid ARQ;
- adding, at a CRC adder coupled to an output of the packet data block generator, an error detection code to the generated packet data block;
- performing, at a channel encoder coupled to an output of the CRC adder, channel encoding on the output of the CRC adder the MIMO multiple transmission method further comprising:
- receiving, at a parallel-to-serial converter of the MIMO multiple transmission device, parallel outputs which are each received from the channel encoder of each of the plurality of upper data streams, and converting the received parallel outputs to serial form;
- performing interleaving, at an interleaver of the MIMO multiple transmission device, between transmission streams on outputs from the parallel-to-serial converter; and
- converting, at a serial-to-parallel converter of the MIMO multiple transmission Device, serial outputs from the interleaver which are outputted in parallel to the plurality of transmission streams;

wherein in each of the transmission streams, the method comprises:
- changing, at a coding rate changer of the MIMO multiple transmission device, a coding rate on an output of the serial-to-parallel converter; and
- data modulating, at a data modulator of the MIMO multiple transmission device, on an output of the coding rate changer.

* * * * *